United States Patent [19]

Prochnow

[11] 4,280,762
[45] Jul. 28, 1981

[54] CAMERA HAVING AN INDEPENDENTLY FOCUSED RETRACTABLE OBJECTIVE LENS

[75] Inventor: Claus Prochnow, Brunswick, Fed. Rep. of Germany

[73] Assignee: Rollei-Werke Franke & Heidecke GmbH & Co., Brunswick, Fed. Rep. of Germany

[21] Appl. No.: 100,358

[22] Filed: Dec. 5, 1979

[30] Foreign Application Priority Data

Dec. 27, 1978 [DE] Fed. Rep. of Germany ....... 2856196

[51] Int. Cl.³ .......................... G03B 3/00; G03B 17/04
[52] U.S. Cl. .................................... 354/187; 354/198
[58] Field of Search ................. 354/198, 195, 187–194

[56] References Cited

U.S. PATENT DOCUMENTS 3,798,670  3/1974  Tanaka .................................. 354/195
4,171,891  10/1974  Scarader ............................. 354/187

FOREIGN PATENT DOCUMENTS 1687088  10/1954  Fed. Rep. of Germany .
W 10307  2/1956  Fed. Rep. of Germany .
1961189  12/1969  Fed. Rep. of Germany .
2404687  7/1977  Fed. Rep. of Germany .

Primary Examiner—John Gonzales
Attorney, Agent, or Firm—Schwartz, Jeffery, Schwaab, Mack, Blumenthal & Koch

[57] ABSTRACT

Disclosed is a camera including a camera housing and an objective lens having an image axis. The objective lens for the camera is mounted in a tube which is movable between an extended exposure position and a retracted storage position. When the tube is in the extended exposure position, an annulus around the tube cooperates with a projection on the tube to set the precise extended position necessary to provide a sharply focused image on the camera film.

3 Claims, 2 Drawing Figures

CAMERA HAVING AN INDEPENDENTLY FOCUSED RETRACTABLE OBJECTIVE LENS

BACKGROUND OF THE INVENTION

The invention generally concerns a photographic camera and particularly a miniature camera having a focusable objective lens.

In cameras of this type, the range setting device is arranged directly on the objective tube in the form of a rotating ring. This setting ring carries a range scale whereby the range number desired must be made to coincide with a marking stationarily arranged on the objective tube, in order to set the range desired. To set the range, the user of the camera is thus always forced to remove the camera from his eye and to set the range on the objective tube. This is extremely disadvantageous, because the observation of the object must be interrupted, when it is desired for example to continuously adjust the range to a moving object. Such a camera is poorly adapted for use in taking snapshots, because its handling is rather cumbersome. The modern requirements of a snapshot camera demamd as a minimum that an indication of range be provided in the viewfinder so that the necessary distance may be set and verified in the viewfinder without taking the camera from the eye, thus interrupting the observation of the object. The indication of a range set on the objective of the camera in a range indicating device in the viewfinder is, technically, extremely involved in a camera with an objective tube which slides in and out and thus is highly subject to problems, and as a result such a device has not been provided.

Another disadvantage of this known camera consists of the fact that the handling of the camera during the setting of the range is not of optimum ease. The diameter of the objective in such cameras having an objective tube capable of sliding in and out is mostly very small so that on the one hand the range scale is arranged in a highly crowded manner, which renders it difficult to read and on the other, the relatively small range setting annulus offers no easy grip that would facilitate handling.

SUMMARY OF THE INVENTION

It is thus an object of the present invention to provide a camera with an objective tube capable of sliding in and out, wherein the handling of the camera with respect to range setting is substantially improved. It is a further object of the present invention to provide an indication of the range selected in the viewfinder by simple means. It is a still further object to provide a camera which is simple in design and provides savings in production costs, while at the same time being sturdy and not susceptible to defects. An additional object is to provide a camera in which the accurate optical alignment of the objective lens in its exposure position is possible.

The above and other objects are achieved by providing a camera including a camera housing and an objective lens having an image axis. Additionally, means for manually setting the range of the camera and means for mounting the objective lens for movement, substantially parallel to the image axis, between an extended exposure position and the retracted storage position are provided. Furthermore, means for variably limiting axial movement of the mounting means in the extended position and means, responsive to the range setting means, for varying the limiting means are also provided. Thus, the mounting means is movable between a retracted position and an extended position and whose extended position is adjusted by said limiting means which in concert with said varying means and in response to the range setting means, adjusts the axial position of the objective lens to ensure a properly focused image.

Further embodiments of the present invention comprise an indicator and a viewfinder reflecting the position of the range setting means and thus the focal distance of the objective lens. Additional embodiments include means for biasing the lens mounting means towards its extended exposure position in combination with means locking the mounting means in a retracted storage position. A further embodiment includes releasing means permitting said lens mounting means under the influence of the biasing means to move to its extended exposure position.

BRIEF DESCRIPTION OF THE DRAWINGS

A more complete appreciation of the invention and the attendant advantages thereof will be more clearly understood by reference to the following drawings wherein.

DETAILED DESCRIPTION OF PREFERRED EMBODIMENTS

Figure 1:
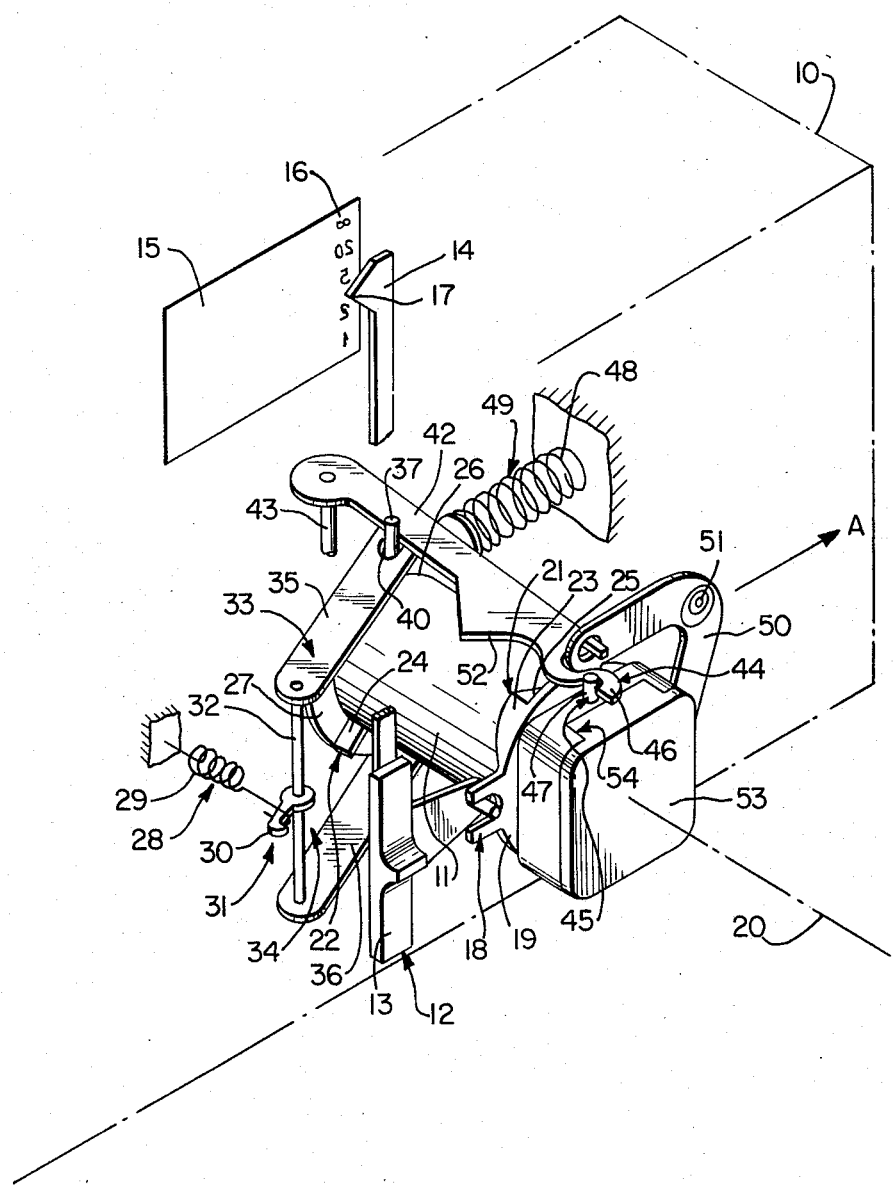
FIG. 1 is a front perspective view of one embodiment of the present invention with the lens tube in the storage position.

The range setting device arranged on the housing of the camera, according to the present invention, facilitates the setting of the range by the user of the camera because this range setting device may be designed independently of the diameter of the objective tube and arranged in an economically favorable manner on the camera housing. Beyond this, a device indicating the range in the viewfinder may be effectuated very simply in association with the range setting device arranged in the housing of the camera. Such a design is of the utmost simplicity. The range setting device arranged in the camera housing is particularly advantageous if a flash unit is additionally integrated with the housing. In such a case the range setter may also be able to perform simultaneous adjusting functions for the flash unit.

As a result of the measures taken in accordance with the invention, in spite of the removal of the range setting device from the objective tube and its arrangement on the housing of the camera, the transmission of the setting of the range from the range setting device to the objective is very simple from a design standpoint, sturdy and has low susceptibility to failure. Further, a significant optical advantage is achieved. By means of the present invention, complete adjustment of the objective lens takes place during the setting of the range and not, as in the case of the prior art camera, only during setting of the front lens. This substantially improves the imaging quality of the objective.

The measures taken in keeping with the invention make it further possible to set the range on a camera not ready for exposure, i.e. with the objective tube retracted into the camera housing. This is of particular advantage for cameras wherein the retracted objective tube is additionally covered in front. Such a capability represents a significant step to improve the camera in the direction of a "rapid shot camera." The range may be set while the camera is still closed. The touch of a button is then sufficient to make the objective tube emerge. The exposure can then be triggered without wasting valuable time on the setting or resetting of the camera. In one embodiment, wedge-like projection on the setting annulus cooperates with at least one projection on the objective tube to effect transmission between the range setting device and the objective tube, that is overall simple in design, inexpensive to manufacture and sturdy.

In a further embodiment a slideout spring is prestressed in the retracted state of the objective tube such that the camera may be made ready for exposure very rapidly. The touch of a button on the corresponding locking element is sufficient to cause the objective tube to slide into its exposure position and to be frictionally arrested. All this may take place without a need for the user of the camera to remove his eye from the viewfinder and thus to interrupt his observation of the object. The preparation time of the camera for the actual performance of an exposure is thus extremely short.

A further embodiment includes a means for locking the objective tube in the camera housing that is simple and reliable and which, simultaneously, may be entrusted with additional functions.

In a further most advantageous embodiment, the satisfactory frictional stopping of the extended objective tube is obtained in its position of exposure, specifically in each of the different axial positions of the objective tube corresponding to the range setting. The objective tube and thus the objective is held securely in its optically correct position and cannot be deflected from this position by the accidental application of lateral pressure on the objective tube by the user of the camera.

In an additional embodiment a spring element secures a locking lever in place when the objective tube is retracted into the camera housing, and it effects the frictional arrest of the objective tube by means of the inclined edges of the locking lever, in the exposure position of the objective tube.

In a further embodiment, the locking of one of the two locking levers with a pin on the objective tube and the other locking lever with a pawl on the front cover which is hingedly mounted on the objective tube, permits the covering of the objective lens when the tube is in its retracted position. This front or objective cover automatically snaps into its open position, uncovering the objective, when the lock of the objective tube is released and the latter slides into its ready position under the pressure of the spring. Because the objective cover is arranged on the front side of the objective tube above the opening of the objective and, in the open position, stands out essentially at a right angle from the front side of the objective tube, the cover additionally performs the function of a sunshade. When converting the camera from its exposure ready position into its transport state, it is merely necessary to deflect the objective cover to the front side of the objective tube and to push the objective tube further into the camera housing by exerting additional pressure on the cover. When the objective tube arrives in its locking position, the locking levers automatically engage the objective tube and the cover and hold both, so that the objective tube is completely inserted in the camera housing and the objective protectively covered.

Figure 2:
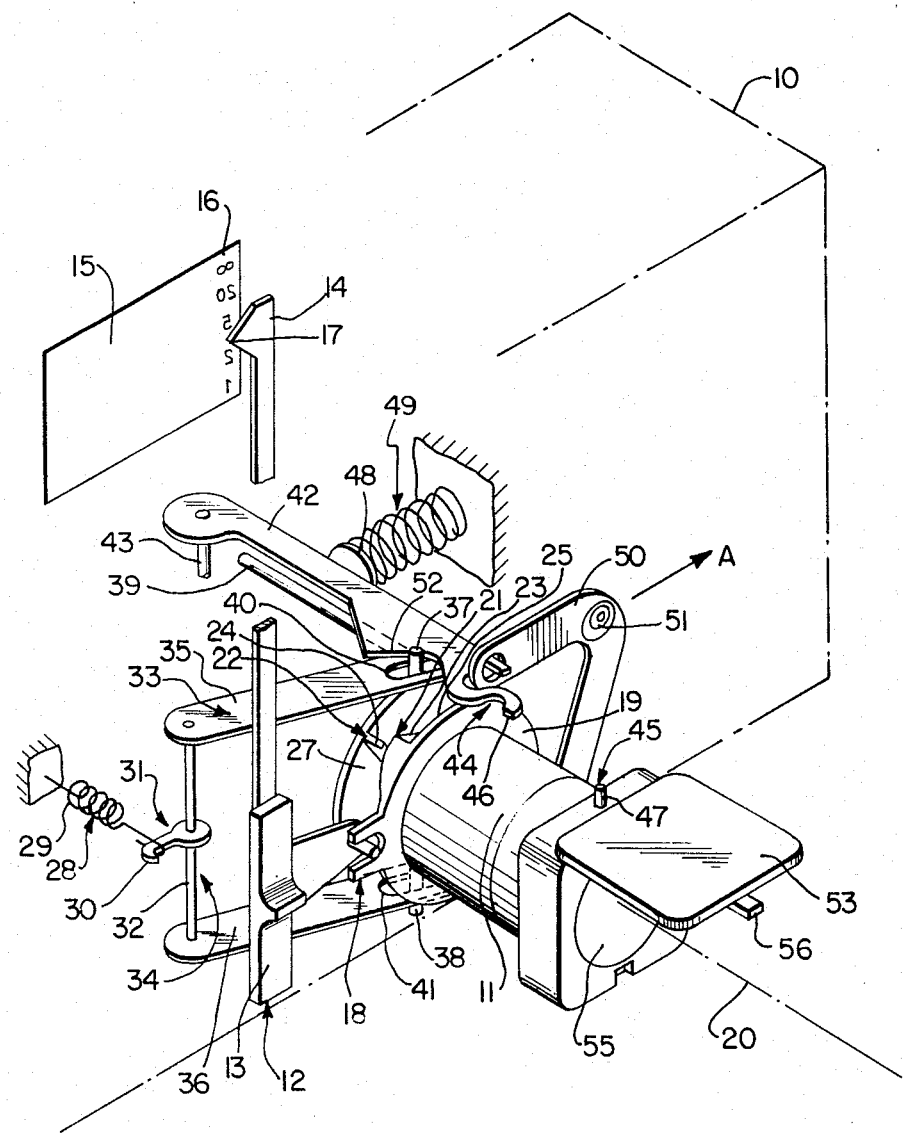
FIG. 2 is a front perspective view of the embodiment of FIG. 1, but in its extended exposure position.

Referring now to the drawings wherein like reference characters designate like parts throughout the several views, FIGS. 1 and 2 illustrate a miniature camera designed for 35 mm film. It has a housing 10 indicated in the drawing by a dash-and-dot line and an objective tube 11 arranged in an axially displaceable manner. In the position ready for exposure of the camera, wherein photographic exposures may be effected, as in FIG. 2, the objective tube 11 protrudes from the housing 10 and assumes its optically correct coordination with respect to the film placed in the window of the camera. When not in use, the objective tube may be inserted completely in the housing 10 as in FIG. 1, so that the camera displays exclusively flat limiting surfaces without protruding parts that would interfere with the suitability for packing of the camera. In this so-called transport state of the camera, the latter is particularly compact and convenient and may be carried comfortably by the user.

In addition to the usual control knobs for the setting of the diaphragm and/or the exposure time and film sensitivity, the camera also has a range setting device 12, arranged on the housing 10. The range setting device 12 is designed in the form of a sliding key 13, mounted transversely to the optical axis 20 in a longitudinally displaceable manner. A pointer 14 is rigidly connected with the range setting device. The pointer 14 serves to visually indicate the range set by means of the range setting device 12. For this purpose, a distance scale 16 is arranged in the viewfinder 15 and the pointer 14 has a marker 17 correlated with the range scale 16 and following the displacement of the range setting device 12 while sliding along the range scale 16.

The range setting device 12 is coupled with a setting annulus 19 by means of a pin and slot 18. The setting annulus 19 is mounted in the housing 10 stationarily in the axial direction but rotatably around the optical axis 20 of the camera. On the setting annulus 19 and on the objective tube 11, the adjusting elements 21 and 22, respectively, are fixably mounted on their support, but in coordination with and displaceable relative to each other. The adjusting elements 21 and 22 rest in frictional contact against each other in the exposure position of the objective tube 11 (FIG. 2) and determine the axial position of the objective tube 11 as a function of the rotating position of the setting annulus. The adjusting elements 21 and 22 are provided herein in the form of wedge-like protrusions 23 and noses 24. The protrusions 23 are mounted on the setting annulus 19, specifically on the rear side 25 of said annulus facing the inside of the housing, and have an axial depth increasing in the circumferential direction of the annulus 19. The noses 24 coordinated with these protrusions 23 protrude from the circumference of the objective tube 11, preferably at the rear end 26 of the tube or close to it.

The noses 24 are arranged on a flange 27 stationarily joined with the objective tube 11 and protruding over the objective tube 11, and are radially aligned. The protrusions 23 and the noses 24 are distributed in a regular manner around the circumference of the setting annulus 19 and the flange 27, respectively. In the exposure position of the objective tube 11, depending on the rotational position of the setting annulus 19, the noses 24 may contact the protrusions 23 at locations where they have different axial depths. As the result, the axial position of the objective tube 11 with respect to the image window can be changed. The actuation of the range setting device 12 thus alters the overall axial position of the objective tube 11 and therefore that of the objective lens held in the tube. With a suitable layout of the range setting device 12 and the axial depth of wedge like protrusion 23, when a certain range is set by means of the sliding key 13 the objective tube 11 is positioned axially by means of the rotation of setting annulus 19. The range indicated by the pointer 14 in the viewfinder 15 is the distance necessary for the objective lens to reproduce sharply on film the object image of the camera.

The objective tube 11 is outwardly biased in the axial direction by an inwardly pulling spring 28, which is prestressed at least in the retracted state of the objective tube 11. In the present case, the spring 28 is provided in the form of a tension spring 29, engaging a lever arm 30 of a dual arm lever 31. The dual arm lever 31 is rotatable around the longitudinal axis of rotating axle 32 which is rotatably mounted in the housing 10 and engages with its other lever arm 33 the objective tube 11, specifically the flange 27. The lever arm 33 is here designed as a rocker arm, possessing two rocker arms 35 and 36, torsionally connected with the rotating axle 32. The tension spring 29 engages the lever arm 30 which is again torsionally connected with the rotating axle 32 and biases the rocker arm 34 in the outward direction of the objective tube.

The objective tube 11 carries on its flange 27, radially protruding and diametrically arranged pilot pins 37 and 38. The two pilot pins 37, 38 enter the guide slots 39 extending along the optical axis 20 (as seen in FIG. 2 where only the upper guide slot 39 is shown). By means of the pilot pins 37 and 38 and the guide slots 39, the objective tube 11 is guided satisfactorily in the axial direction. The two rocker arms 35 and 36 of the rocker 34, each have a slit 40 and 41, respectively, at their free ends, whereby they embrace the two pilot pins 37 and 38. This provides a hinged connection between the rocker 34 and the objective 11 so that the rocking motion of the rocker 34 is translated into an axial displacement of the objective tube 11.

In the housing 10 of the camera, a locking lever 42 is pivotably arranged about a rotation axle 43. An identical locking lever, again rotatable around the axle 43, is found on the underside of the objective tube 11, diametrically opposed to the upper locking lever 42. For reasons of clarity of the drawing, the lower locking lever is not shown. It is, however, identical with the upper locking lever 42 so that any reference to said upper locking lever 42 is equally valid for the lower locking lever. The locking lever 42 and the objective tube 11 both carry mutually coordinated and interlocking arresting elements 44 and 45, respectively, which engage each other in the retracted state of the objective tube 11, thus locking the objective tube in place in its retracted position with spring 28 under stress.

The arresting element 44 on the locking lever 42 is designed as arresting pawl 46 and the arresting element 45 on the objective tube 11 as a plunger pin 47. The plunger pin 47 is arranged on the front end of the objective tube 11. The locking lever 42 is prestressed by means of a spring element 49, provided in the form of a helical compression spring 48 so as to support the arresting action of the arresting elements 44 and 45. The locking lever 42 is coupled with manually actuated release element 50 carrying a slide knob 51, which protrudes form the front side of the camera housing 10 and may be displaced manually, in a direction transverse to the optical axis 20. Upon the displacement of the slide knob 51, the locking lever 42 is rotated against the force of the helical compression spring 48 and the arresting elements 44 and 45 are disengaged. The objective tube 11 is released. Under the effect of the spring 28 the rocker arm 34 urges the objective tube 11 into its exposure position.

The locking lever 42 has a bevelled edge 52 inclined at an acute angle to the optical axis 20. In the exposure position of the objective tube 11, i.e. with the objective tube 11 protruding from the housing 10, this bevelled edge 52 is resting in frictional contact against the pilot pin 37 and urges the objective tube 11 in the outward direction. Correspondingly, the lower locking lever is in frictional contact by means of a similar bevelled edge with the pilot pin 38. The frictional contact joining the bevelled edges 52 and the pilot pins 37 and 38, respectively, is effected by the helical compression spring 48. This application pressure of the helical compression spring may be dimensioned exactly and is nearly always constant, because the position of the locking lever 42 and thus the compression of the helical spring 48 is unchanging in almost all possible positions of the objective tube 11 along the optical axis 20.

On the front side of the objective tube 11 an objective lens cover 53 is pivotally mounted. The mounting point 54 of the cover 53 is located above the lens opening 55 of the objective tube 11. On its side opposite to the mounting point 54, the objective cover 53 carries an arresting projection 56 (FIG. 2). When the objective cover 53 is pressed onto the orifice 55 of the objective tube 11 (the position of FIG. 1), the arresting projection 56 is embraced by the pawl of the lower locking lever in the manner described hereinabove for the upper locking lever 47 and the plunger pin 47 on the upper side of the objective tube 11. When the objective cover 53 is in place on the objective tube 11 and the tube 11 retracted, the latter is held in position on the one hand by the engagement of the upper locking lever 42 with the plunger pin 47 and on the other hand by the engagement of the lower locking lever 42 with the arresting projection 56 of the objective cover, whereby the objective cover 53 is also held simultaneously in its position covering the objective lens.

The objective cover 53 is prestressed by means of a spring, not shown, so that, upon release, it automatically assumes the position shown in FIG. 2, thus essentially protruding at right angles from the front side of the objective tube 11. The objective cover 53 therey automatically uncovers the objective lens and simultaneously assumes a position wherein it acts as a sunshade.

In the transport state of the camera, i.e. when not in use (as in FIG. 1), the objective tube 11 is completely retracted into the housing 10 of the camera. The objective cover 53 is fixed onto the front side of the objective tube 11 and covers the lens opening 55 thereof and thus the objective lens in a protective manner. In this position, the objective tube 11 and the objective cover 53 is held in position by the two locking levers; of these, only the upper locking cover 42 is visible in the figures. The latter embraces with its pawl 46 the plunger pin 47 on the objective tube 11, while the lower locking lever with its similarly designed pawl grips the arresting protrusion 56 of the objective cover 53. The helical compression spring 48 maintains the secure locking of the objective tube 11 and the objective cover 53. In this position, the spring 28 is under stress.

The displacement of the sliding knob 51 of the release element 50 in the direction of the arrow A, pulls the two locking levers 42 in the direction of the arrow A. The upper locking lever pawl 46 and the plunger pin 47, and the lower locking lever pawl and the arresting protrusion 56 are disengaged. The spring 28 urges the objective tube 11 by means of the rocker 34 out of the housing, until the protrusions 24 come to rest against the wedge-like protrusions 23. Depending on the rotational position of the setting annulus 19, corresponding to the range setting by means of the range setting device 12, the objective tube 11 emerges, more or less, from the housing 10. Simultaneously with the release of the lock between the arresting protrusion 56 and the lower locking lever, the objective cover 53 opens and assumes its position shown in FIG. 2. Upon the release of the sliding knob 51, the release element 50 and the upper and lower locking levers 42 return to the position shown in FIG. 2. The upper locking lever 42 with its bevelled edge 52 thereby comes to rest against the pilot pin 37 and the lower locking lever correspondingly with its bevelled edge against the pilot pin 38. The extended objective tube 11 is thus satisfactorily arrested and secured in its position of exposure.

In the example of embodiment described hereinabove, the objective cover 53 is designed so that it may be removed without difficulty from the objective tube 11. This is achieved in the simplest manner by the suitable design of the mounting 54. This makes it possible to mount further attachments in place of the objective cover 53 on the objective, particularly optical attachments. Thereby, for example, rapid changes between two focal lengths of the objective may be effected. During transportation, i.e., with the objective tube 11 retracted, such an adapter objective is securely fastened to the camera.

Although the invention has been described relative to a specific embodiment thereof, it is not so limited and many modifications and variations thereof will be readily apparent to those skilled in the art in light of the above teachings. It is, therefore, to be understood that, within the scope of the appended claims, the invention may be practiced otherwise than as specifically described.

The embodiments of the invention in which an exclusive property or privilege is claimed are defined as follows:

1. A camera including a camera housing and an objective lens having an image axis:

means for manually setting the focal range of said camera;

means for mounting said objective lens for movement substantially parallel to said image axis, between an extended exposure position and retracted storage position;

means for variably limiting axial movement of said mounting means in said extended position;

means, responsive to said range setting means, for varying said limiting means; and means for releasably locking said mounting means in said storage position, said locking means comprising at least one locking lever pivotally mounted at one end with an arresting pawl on the other end and a plunger pin mounted on said mounting means such that in said storage position said pawl releasably engages said plunger pin preventing extention of said mounting means, said locking means further including means for releasing said plunger pin from engagement with said pawl, said releasing means comprising a release element internal to said camera housing, and connected to said locking means; and a manually actuated knob, external to said housing, for operating said release lever removing said locking means pawl from engagement with said plunger pin, said camera further comprising an objective lens cover, pivotally mounted on said mounting means for movement between an open position and a closed position, said cover including an arresting projection, wherein said locking means comprises two locking levers disposed in diametrically opposing positions with respect to said mounting means, said one end of each of said levers pivotally mounted on a common pivoting axle and said arresting pawl of one of said locking levers releasably engages said plunger pin and said arresting pawl of the other of said locking levers releasably engages said arresting projection only when said cover is in said closed position and said mounting means is in said storage position.

2. The camera according to claim 1, said camera including means for biasing said cover towards said open position, said cover in said open position being essentially parallel with said axis.

3. The camera according to claim 1, said camera further including a viewfinder with a range scale and a pointer connected to said range setting means and extending into said viewfinder for indicating on said range scale the focal distance of said objective lens.

* * * * *